(12) United States Patent
Miura et al.

(10) Patent No.: US 7,227,826 B2
(45) Date of Patent: Jun. 5, 2007

(54) METHOD OF RECORDING INFORMATION IN OPTICAL RECORDING MEDIUM, INFORMATION RECORDING APPARATUS AND OPTICAL RECORDING MEDIUM

(75) Inventors: Hideaki Miura, Tokyo (JP); Tatsuya Kato, Tokyo (JP); Tetsuro Mizushima, Tokyo (JP)

(73) Assignee: TDK Corporation, Tokyo (JP)

( * ) Notice: Subject to any disclaimer, the term of this patent is extended or adjusted under 35 U.S.C. 154(b) by 484 days.

(21) Appl. No.: 10/503,954

(22) PCT Filed: Feb. 14, 2003

(86) PCT No.: PCT/JP03/01550

§ 371 (c)(1),
(2), (4) Date: Aug. 9, 2004

(87) PCT Pub. No.: WO03/069607

PCT Pub. Date: Aug. 21, 2003

(65) Prior Publication Data

US 2005/0073940 A1    Apr. 7, 2005

(30) Foreign Application Priority Data

Feb. 14, 2002 (JP) .............................. 2002-037240

(51) Int. Cl.
*G11B 3/74*    (2006.01)
(52) U.S. Cl. ........................................ 369/94
(58) Field of Classification Search ............... None
See application file for complete search history.

(56) References Cited

U.S. PATENT DOCUMENTS 6,343,060 B1 *  1/2002  Ko ........................... 369/275.1

(Continued)

FOREIGN PATENT DOCUMENTS

EP    0 243 976    11/1987

(Continued)

OTHER PUBLICATIONS

Narumi, Kenji et al., "45GB Rewritable Dual-Layer Phase-Change Optical Disk with a Transmittance Balanced Structure", Technical Digest ISOM'01, International Symposium on Optical Memory 2001, Oct. 16-19, 2001, 3 pgs.

*Primary Examiner*—Paul W. Huber
(74) *Attorney, Agent, or Firm*—Seed IP Law Group PLLC

(57) ABSTRACT

It is an object of the present invention to provide an information recording method for recording information in a data rewritable type optical recording medium having a plurality of information recording layers whereby a sufficiently high erasing efficiency can be ensured when data recorded in any one of the information recording layers are directly overwritten. In the information recording method according to the present invention, information is recorded in an optical recording medium 10 having at least a stacked L0 layer 20 and L1 layer 30 by projecting a laser beam thereonto via a light incidence plane 13a. In the case where information is to be recorded in the optical recording medium 10, information is recorded in the L0 layer 20 using an off-pulse recording format and information is recorded in the L1 layer 30 using an on-pulse recording format. As a result, even in the case of directly overwriting data recorded in either of the L0 layer 20 or the L1 layer 30, a sufficiently high erasing efficiency can be ensured.

16 Claims, 10 Drawing Sheets

U.S. PATENT DOCUMENTS

| | | | |
|---|---|---|---|
| 6,621,786 B2 * | 9/2003 | Mons et al. | 369/94 |
| 6,952,391 B2 * | 10/2005 | Moriya et al. | 369/275.1 |
| 2001/0005350 A1 | 6/2001 | Kitaura et al. | 369/94 |

FOREIGN PATENT DOCUMENTS

| | | |
|---|---|---|
| EP | 0 265 971 | 5/1988 |
| EP | 0 957 477 | 11/1999 |
| EP | 1 117 094 | 7/2001 |
| EP | 1 178 472 | 2/2002 |
| JP | 2000-036130 | 2/2000 |
| JP | 2001184792 | 7/2001 |
| JP | 2001-273638 | 10/2001 |

* cited by examiner

METHOD OF RECORDING INFORMATION IN OPTICAL RECORDING MEDIUM, INFORMATION RECORDING APPARATUS AND OPTICAL RECORDING MEDIUM

This application is a 371 of PCT/JP03/01550, filed Feb. 14, 2003.

BACKGROUND OF THE INVENTION

The present invention relates to a method of recording information in an optical recording medium, and particularly to a method of recording information in a data rewritable type optical recording medium having a plurality of information recording layers. Further, the present invention relates to an information recording apparatus for recording information in an optical recording medium, and particularly to an information recording apparatus for recording information in a data rewritable optical recording medium having a plurality of information recording layers. Furthermore, the present invention relates to an optical recording medium, and particularly to a data rewritable optical recording medium.

DESCRIPTION OF THE PRIOR ART

Optical recording media typified by the CD and the DVD have been widely used as recording media for recording digital data. The recording capacity demanded of such optical recording media has increased year by year, and various proposals have been made to achieve this. One of these proposals is a technique that uses a two-layer structure for the information recording layers contained in the optical recording media, which has found practical application in the DVD-Video and DVD-ROM formats which are read-only optical storage media. With such read-only optical recording media, pre-pits formed on the substrate surface become the information recording layer, and such substrates have a laminated structure with an intervening intermediate layer.

In addition, in recent years, proposals have been made for optical recording media with a two-layer structure for the information recording layer to be used also as an optical recording medium in which data can be rewritten (data rewritable type optical recording medium) (See Japanese Patent Application Laid Open NO. 2001-273638). Such a data rewritable type optical recording medium has a structure in which a recording film and dielectric films between which they are sandwiched form an information recording layer, and these information recording layers are laminated.

A phase change material is generally used for forming a recording film of a data rewritable type optical recording medium and data are recorded utilizing the difference in the reflection coefficients between the case where the recording film is in a crystal phase and the case where it is in an amorphous phase. More specifically, in an unrecorded state, substantially the entire surface of the recording film is in a crystal phase and when data are recorded, the phase of a predetermined region of the recording film is changed to the amorphous phase to form a recording pit. The phase of the phase change material in the crystal phase can be changed to the amorphous phase by heating the phase change material to a temperature equal to or higher than the melting point thereof and quickly cooling it. On the other hand, the phase change material in the amorphous phase can be crystallized by heating the phase change material to a temperature equal to or higher than the crystallization temperature thereof and gradually cooling it.

Such heating and cooling can be performed by adjusting the power (output) of a laser beam. In other words, it is possible not only to record data in an unrecorded recording film but also to directly overwrite (direct-overwrite) a recording mark already formed in a region of the recording film with a different recording mark by modulating the intensity of the laser beam. Generally, the power of the laser beam is modulated in accordance with a pulse waveform having an amplitude between a recording power (Pw) and a bottom power (Pb) in order to heat the recording film to a temperature equal to or higher than the melting point thereof and the power of the laser beam is set to the bottom power (Pb) in order to quickly cool the recording film. Further, in order to heat the recording film to a temperature equal to or higher than the crystallization temperature thereof and gradually cool it, the power of a laser beam is set to an erasing power (Pe). In this case, the erasing power (Pe) is set to a level at which the recording film is heated to a temperature equal to or higher than the crystallization temperature thereof and lower than the melting point thereof, thereby performing so-called solid phase erasing.

Here, in a data rewritable type optical recording medium having two information recording layers, since data are recorded or reproduced by focusing a laser beam onto one of the information recording layers, in the case of recording data in or reproducing data from the information recording layer farther from the light incidence plane (hereinafter referred to as an "L1 layer"), a laser beam is projected thereonto via the information recording layer closer to the light incidence plane (hereinafter referred to as an "L0 layer"). Therefore, since it is necessary for the L0 layer to have a sufficiently high light transmittance, it is general to form the recording film included in the L0 layer so as to have a thickness considerably thinner than that of the recording film included in the L1 layer.

In this manner, since the thickness of the recording film included in the L0 layer is set considerably thinner than that of the recording film included in the L1 layer in a data rewritable type optical recording medium having two information recording layers, when data recorded in the L0 layer is directly overwritten, it is difficult to ensure a sufficiently high erasing efficiency. This is because if the recording film is very thin, the phase change material is more stable in the amorphous phase than in the crystal phase and the phase change material is hard to crystallize by the solid phase erasing, while if the recording film has a thickness equal to or thicker than a predetermined thickness, since the recording film is more stable in the crystal phase than in the amorphous phase, a sufficiently high erasing efficiency can be ensured by the solid phase erasing.

SUMMARY OF THE INVENTION

Accordingly, it is an object of the present invention to provide an information recording method for recording information in a data rewritable type optical recording medium having a plurality of information recording layers, which method ensures a sufficiently high erasing efficiency when data recorded in any one of the information recording layers are directly overwritten.

Further, another object of the present invention is to provide an information recording apparatus for recording information in a data rewritable type optical recording medium having a plurality of information recording layers, which apparatus ensures a sufficiently high erasing efficiency when data recorded in any one of the information recording layers are directly overwritten.

Moreover, a further object of the present invention is to provide a data rewritable type optical recording medium having a plurality of information recording layers, which medium ensures a sufficiently high erasing efficiency when data recorded in any one of the information recording layers are directly overwritten.

The above object of the present invention can be accomplished by an information recording method for recording information in a data rewritable type optical recording medium having at least stacked first and second information recording layers by projecting a laser beam thereonto via a light incidence plane, the information recording method comprising steps of recording information in the first information recording layer in accordance with an off-pulse recording format and recording information in the second information recording layer in accordance with an on-pulse recording format.

In a preferred aspect of the present invention, the first information recording layer is located on the side of the second information recording layer on which the light incidence plane is present.

In a further preferred aspect of the present invention, each of the first and second information recording layers includes a recording film formed of a phase change material and dielectric layers sandwiching the recording film therebetween and the recording film included in the first information recording layer is thinner than that included in the second information recording layer.

The above object of the present invention can be also accomplished by an information recording method for recording information in an optical recording medium having at least stacked first and second information recording layers containing a phase change material by projecting a laser beam thereonto via a light incidence plane, the information recording method comprising steps of recording information in the first information recording layer in accordance with a pulse train pattern by which data can be melt erased and recording information in the second information recording layer in accordance with a pulse train pattern by which data can be solid phase erased.

The above object of the present invention can be also accomplished by an information recording method for recording information in an optical recording medium having at least stacked first and second information recording layers containing a phase change material by projecting a laser beam thereonto via a light incidence plane, the information recording method comprising steps of recording information in the first information recording layer by modulating intensity of the laser beam between two values and recording information in the second information recording layer by modulating intensity of the laser beam between three or more values.

The above object of the present invention can be also accomplished by an information recording apparatus for recording information in a data rewritable type optical recording medium having at least stacked first and second information recording layers by projecting a laser beam thereonto via a light incidence plane, the information recording apparatus being constituted so as to record information in the first information recording layer in accordance with an off-pulse recording format and record information in the second information recording layer in accordance with an on-pulse recording format.

In a preferred aspect of the present invention, the first information recording layer is located on the side of the second information recording layer on which the light incidence plane is present.

In a further preferred aspect of the present invention, each of the first and second information recording layers includes a recording film formed of a phase change material and dielectric layers sandwiching the recording film therebetween and the recording film included in the first information recording layer is thinner than that included in the second information recording layer.

The above object of the present invention can be also accomplished by an optical recording medium which includes at least stacked first and second information recording layers and in which information can be recorded by projecting a laser beam thereonto via a light incidence plane, which optical recording medium comprises setting information required for recording information in the first information recording layer in accordance with an off-pulse recording format and recording information in the second information recording layer in accordance with an on-pulse recording format.

In a preferred aspect of the present invention, the first information recording layer is located on the side of the second information recording layer on which the light incidence plane is present.

In a further preferred aspect of the present invention, each of the first and second information recording layers includes a recording film formed of a phase change material and dielectric layers sandwiching the recording film therebetween and the recording film included in the first information recording layer is thinner than that included in the second information recording layer.

In a further preferred aspect of the present invention, the recording film included in the first information recording layer has a thickness 0.3 to 0.8 times that of the recording film included in the second information recording layer.

According to the present invention, a sufficiently high erasing efficiency can be ensured when data recorded in any one of the information recording layers are directly overwritten.

BRIEF DESCRIPTION OF THE DRAWINGS

FIG. 6 is a set of waveform diagrams showing pulse train patterns used for recording data in an L0 recording film 22 of an optical recording medium 10, wherein FIG. 6(a) shows a case of recording a 2T signal or a 3T signal, FIG. 6(b) shows a case of recording a 4T signal or a 5T signal, FIG. 6(c) shows a case of recording a 6T signal or a 7T signal and FIG. 6(d) shows a case of recording an 8T signal.

FIG. 7 is a set of waveform diagrams showing pulse train patterns used for recording data in an L1 recording film 32 of an optical recording medium 10, wherein FIG. 7(a) shows a case of recording a 2T signal, FIG. 7(b) shows a case of recording a 3T signal, FIG. 7(c) shows a case of recording a 4T signal and FIG. 7(d) shows a case of recording one of a 5T signal to an 8T signal.

FIG. 9 is a set of waveform diagrams showing pulse train patterns used for recording data in an L0 recording film 22 of a DVD type optical recording medium, wherein FIG. 9(a) shows a case of recording a 10T signal or an 11T signal and FIG. 9(b) shows a case of recording one of a 12T signal to a 14T signal.

FIG. 10 is a set of waveform diagrams showing pulse train patterns used for recording data in an L1 recording film 32 of a DVD type optical recording medium, wherein FIG. 10(a) shows a case of recording a 3T signal, FIG. 10(b) shows a case of recording a 4T signal, FIG. 10(c) shows a case of recording a 5T signal and FIG. 10(d) shows a case of recording one of a 6T signal to a 14T signal.

DESCRIPTION OF THE PREFERRED EMBODIMENTS

Preferred embodiments of the present invention will be explained in detail with reference to the drawings.

Figure 1:
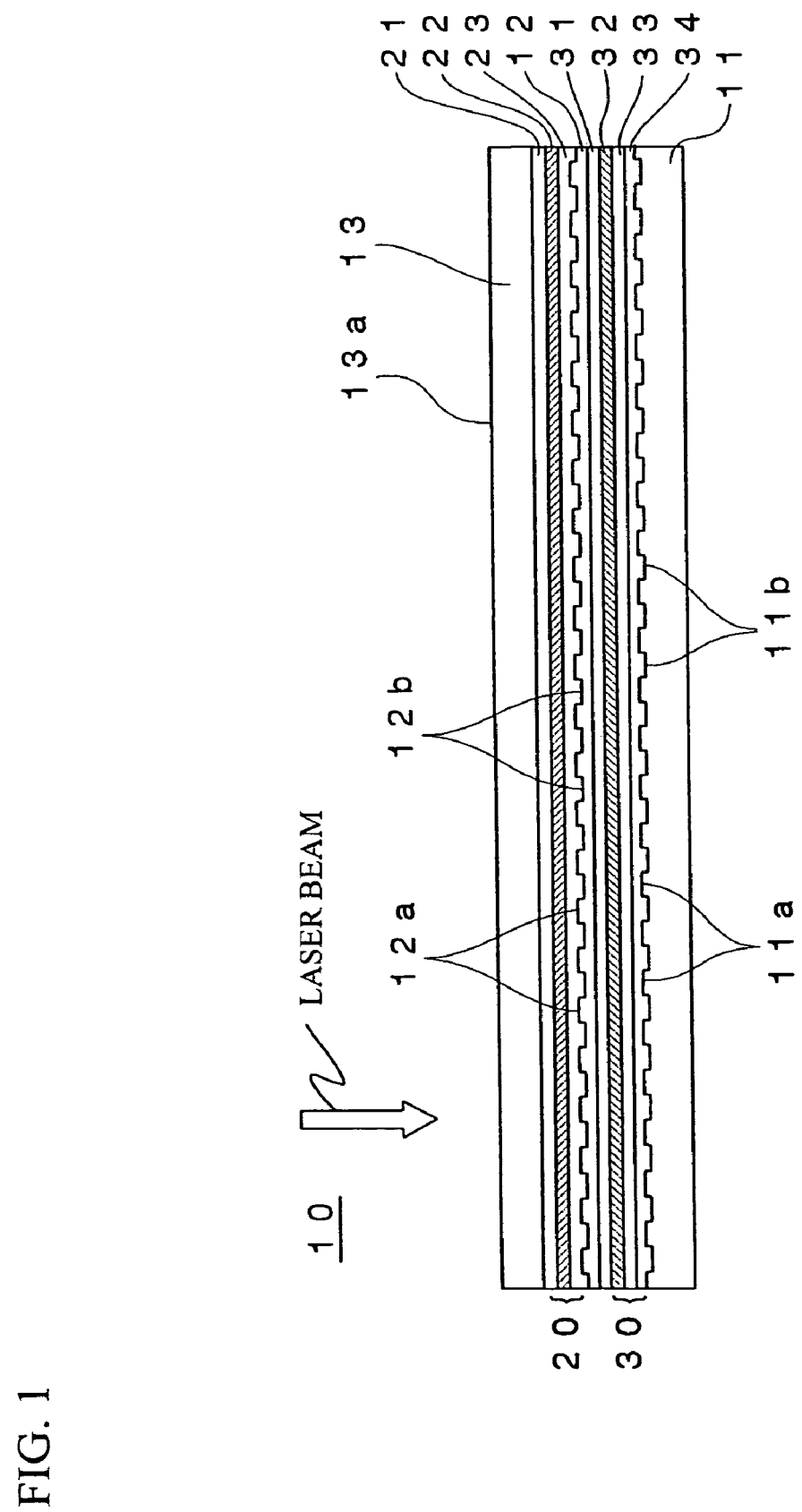
FIG. 1 is a schematic cross section illustrating the structure of an optical recording medium 10 according to a preferred embodiment of the present invention.

FIG. 1 is a schematic cross section illustrating the structure of an optical recording medium 10 according to a preferred embodiment of the present invention.

As shown in FIG. 1, an optical recording medium 10 according to this embodiment includes a substrate 11, an intermediate layer 12, a light transmission layer 13, an L0 layer 20 provided between the intermediate layer 12 and the light transmission layer 13 and an L1 layer 30 provided between the substrate 11 and the intermediate layer 12. The L0 layer 20 constitutes an information recording layer far from a light incidence plane 13a and is constituted by a first dielectric film 21, an L0 recording film 22 and a second dielectric film 23. Further, the L1 layer 30 constitutes an information recording layer close to the light incidence plane 13a and is constituted by a third dielectric film 31, an L1 recording film 32 and a fourth dielectric film 33. In this manner, the optical recording medium 10 according to this embodiment includes two information recording layers (the L0 layer 20 and the L1 layer 30).

The substrate 11 is a disc-like substrate having a thickness of about 1.1 mm serving as a support for ensuring mechanical strength required for the optical recording medium 10 and grooves 11a and lands 11b are formed on the surface thereof. The grooves 11a and/or lands 11b serve as a guide track for the laser beam L when data are to be recorded in the L1 layer 30 or when data are to be reproduced from the L1 layer 30. Although the depth of the groove 11a is not particularly limited, it is preferably set to 10 nm to 40 nm and the pitch of the grooves 11a is preferably set to 0.2 μm to 0.4 μm. Various materials can be used for forming the substrate 11 and the substrate 11 can be formed of glass, ceramic, resin or the like. Among these, resin is preferably used for forming the substrate 11 since resin can be easily shaped. Illustrative examples of resins suitable for forming the substrate 11 include polycarbonate resin, olefin resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin or olefin resin is most preferably used for forming the substrate 11 from the viewpoint of easy processing, optical characteristics and the like. In this embodiment, since the laser beam L does not pass through the substrate 11, it is unnecessary for the substrate 11 to have a light transmittance property.

The intermediate layer 12 serves to space the L0 layer 20 and the L1 layer 30 apart by a sufficient distance and grooves 12a and lands 12b are formed on the surface thereof. The grooves 12a and/or lands 12b serve as a guide track for the laser beam L when data are to be recorded in the L0 layer 20 or when data are to be reproduced from the L0 layer 20. The depth of the groove 12a and the pitch of the grooves 12a can be set to be substantially the same as those of the grooves 11a formed on the surface of the substrate 11. The depth of the intermediate layer 12 is preferably set to be 10 μm to 50 μm. The material for forming the intermediate layer 12 is not particularly limited and an ultraviolet ray curable acrylic resin is preferably used for forming the intermediate layer 12. It is necessary for the transparent intermediate layer 12 to have sufficiently high light transmittance since the laser beam L passes through the transparent intermediate layer 12 when data are to be recorded in the L1 layer 30 and data recorded in the L1 layer 30 are to be reproduced.

The light transmission layer 13 forms an optical path of a laser beam and a light incident plane 13a is constituted by one of the surfaces thereof. The thickness of the light transmission layer 13 is preferably set to be 30 μm to 200 μm. The material for forming the light transmission layer 13 is not particularly limited and, similarly to the intermediate layer 12, an ultraviolet ray curable acrylic resin is preferably used for forming the light transmission layer 13. As described above, it is necessary for the light transmission layer 13 to have sufficiently high light transmittance since the laser beam L passes through the transparent intermediate layer 13.

Each of the L0 recording film 22 and the L1 recording film 32 is formed of a phase change material. Utilizing the difference in the reflection coefficients between the case where the L0 recording film 22 and the L1 recording film 32 are in a crystal phase and the case where they are in an amorphous phase, data are recorded in the L0 recording film 22 and the L1 recording film 32. The material for forming the L0 recording film 22 and the L1 recording film 32 is not particularly limited but it is preferable to form them using a SbTe system material. As the SbTe system material, SbTe may be used alone, or InSbTeGe, AgInSbTe, Ag SbTeGe, AgInSbTeGe or the like containing In, Te, Ge, Ag or the like as additives may be used.

Since the laser beam passes through the L0 recording film 22 when data are recorded in the L1 layer 30 and data recorded in the L1 layer 30 are reproduced, it is necessary for the L0 layer 20 to have a high light transmittance. Therefore, the thickness of the L0 recording film 22 is set to be considerably thinner than that of the L1 recording film 32. Concretely, it is preferable to set the thickness of the L1 recording film 32 to be about 3 to 20 nm and the thickness of the L0 recording film 22 to be 0.3 to 0.8 times that of the L1 recording film 32.

The first dielectric film 21 and the second dielectric film 23 formed so as to sandwich the L0 recording film 22 serve as protective films for the L0 recording film 22 and the third dielectric film 31 and the fourth dielectric film 33 formed so as to sandwich the L1 recording film 32 serve as protective films for the L1 recording film 32. The thickness of the first dielectric film 21 is preferably set to be 2 to 200 nm, the thickness of the second dielectric film 23 is preferably set to be 2 to 200 nm, the thickness of the third dielectric film 31 is preferably set to be 2 to 200 nm and the thickness of the fourth dielectric film 33 is preferably set to be 2 to 200 nm.

Each of these dielectric films may have a single-layered structure or may have a multi-layered structure including a plurality of dielectric films. The material for forming each of these dielectric films is not particularly limited but it is preferable to form it of oxide, nitride, sulfide, carbide of Si, Al, Ta and Zn such as $SiO_2$, $Si_3O_4$, $Al_2O_3$, AlN, TaO, ZnS, $CeO_2$ and the like or a combination thereof.

The reflective film 34 serves to reflect the laser beam entering through the light incident plane 13a so as to emit it from the light incident plane 13a and the thickness thereof is preferably set to be 20 to 200 nm. The material for forming the reflective film 34 is not particularly limited but the reflective film 34 is preferably formed of an alloy containing Ag or Al as a primary component and may be formed of Au, Pt or the like. Further, a moisture proof film may be provided between the reflective film 34 and the substrate 11 in order to prevent the reflective film 34 from being corroded. Materials usable for forming each of the first dielectric film 21 to the fourth dielectric film 33 can be used for forming the moisture proof film. Further, although the L0 layer 20 includes no reflective film, a thin reflective film having a thickness of about 3 to 15 nm may be provided in the L0 layer 20. In this case, the reflective film can be formed of the same material as used for forming the reflective film 34.

When data recorded in the thus constituted optical recording medium 10 are reproduced, a laser beam having a wavelength of 200 to 450 nm is projected onto the optical recording medium 10 via the light incidence plane 13a and the amount of the laser beam reflected from the optical recording medium 10 is detected. As described above, since the L0 recording film 22 and the L1 recording film 32 are formed of the phase change material and the reflection coefficient in the case where the phase change material is in the crystal phase and that in the case where it is in the amorphous phase are different from each other, it is possible to judge by projecting the laser beam via the light incidence plane 13a, focusing it onto one of the L0 recording film 22 and the L1 recording film 32 and detecting the amount of the laser beam reflected therefrom whether a region of the L0 recording film 22 or the L1 recording film 32 irradiated with the laser beam is in the crystal phase or the amorphous phase.

When data are to be recorded in the optical recording medium 10, a laser beam having a wavelength of 200 to 450 nm is projected to be focused onto one of the L0 recording film 22 and the L1 recording film 32 and in accordance with data to be recorded therein, a predetermined region of one of the L0 recording film 22 and the L1 recording film 32 is heated to a temperature equal to or higher than the melting point thereof and quickly cooled, thereby changing the phase thereof to the amorphous phase or a predetermined region of one of the L0 recording film 22 and the L1 recording film 32 is heated to a temperature equal to or higher than the crystallization temperature and gradually cooled, thereby changing the phase thereof to the crystal phase. The region whose phase has been changed to the amorphous phase is referred to as "a recording mark" and recorded data are expressed by the length from the starting point of the recording mark to the ending point thereof and the length from the ending point thereof to the starting point of the next recording mark. The length of each recording mark and the length between recording marks (edge to edge) are set to one of the lengths corresponding to 2T through 8T (where T is the clock period) when adopting the (1,7) RLL modulation scheme, although this is no particular limitation. A pulse train pattern used for recording data in the L0 recording film 22 and a pulse train pattern used for recording data in the L1 recording film 32 will be described later.

When recording data in or reproducing data from the L1 layer 30, a laser beam is projected onto the L1 recording film 32 via the L0 layer 20. Therefore, it is necessary for the L0 layer 20 to have a high light transmittance and, as pointed out above, the thickness of the L0 recording film 22 is set to be considerably thinner than that of the L1 recording film 32.

Here follows a description of the method of manufacturing an optical recording medium 10 according to this preferred embodiment.

FIGS. 2 to 5 are step drawings illustrating the method of manufacturing the optical recording medium 10.

Figure 2:
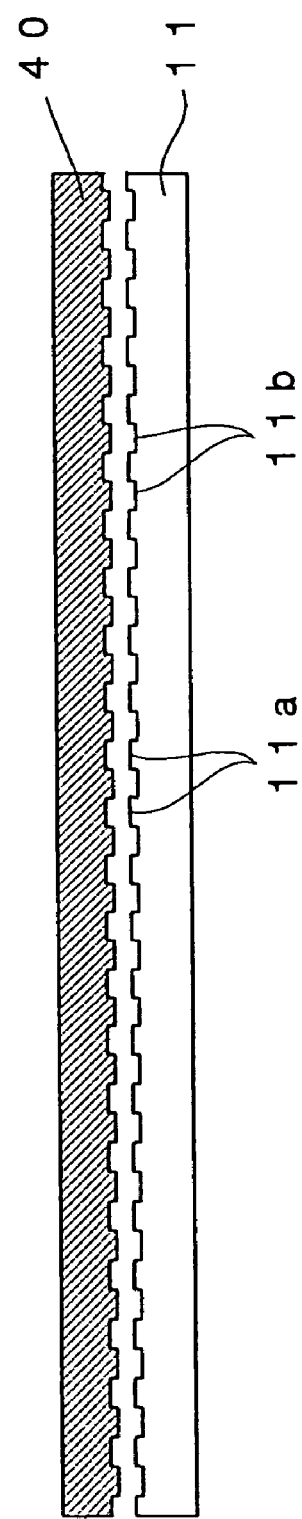
FIG. 2 is a drawing illustrating a part of a process (a step for forming a substrate 11) for manufacturing an optical recording medium 10.
Figure 3:
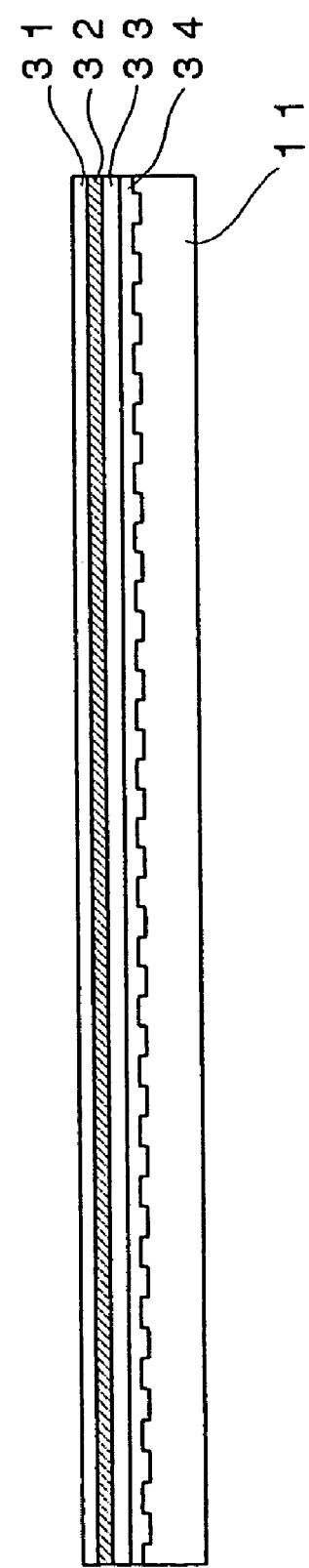
FIG. 3 is a drawing illustrating a part of a process (a step for forming an L1 layer 30) for manufacturing an optical recording medium 10.

First, as shown in FIG. 2, a stamper 40 is used to perform injection molding of a substrate 11 having grooves 11a and lands 11b. Next, as shown in FIG. 3, the sputtering method is used to form, upon nearly the entire surface of the side of the substrate 11 on which the grooves 11a and the lands 11b are formed, a reflective film 34, a fourth dielectric film 33, an L1 recording film 32 and a third dielectric film 34 in this order, thereby forming an L1 layer 30. Here, the phase of the L1 recording film 32 is normally in an amorphous phase immediately after the sputtering is completed.

Figure 4:
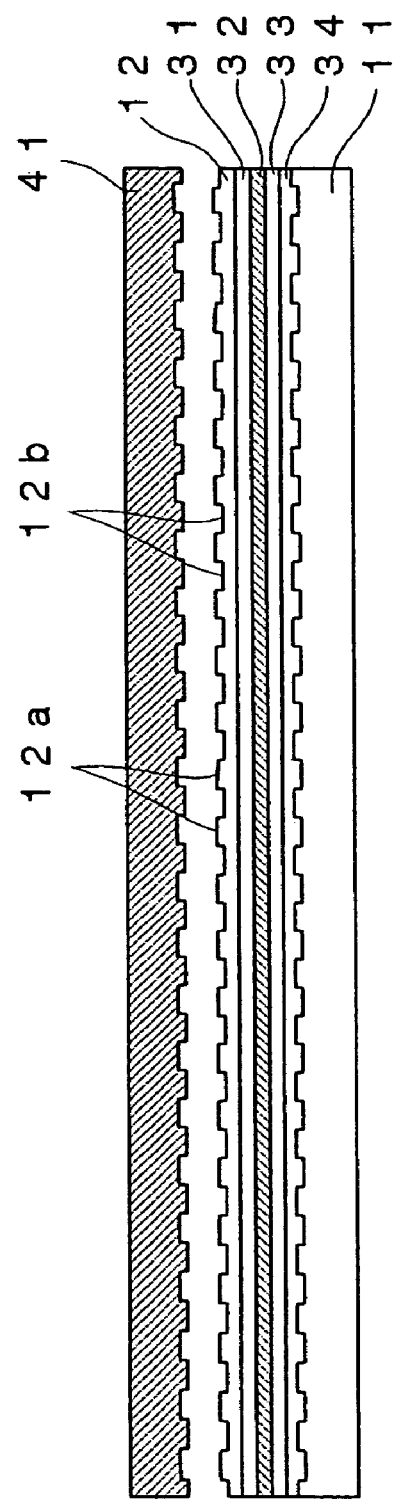
FIG. 4 is a drawing illustrating a part of a process (a step for forming a transparent intermediate layer 12) for manufacturing an optical recording medium 10.
Figure 5:
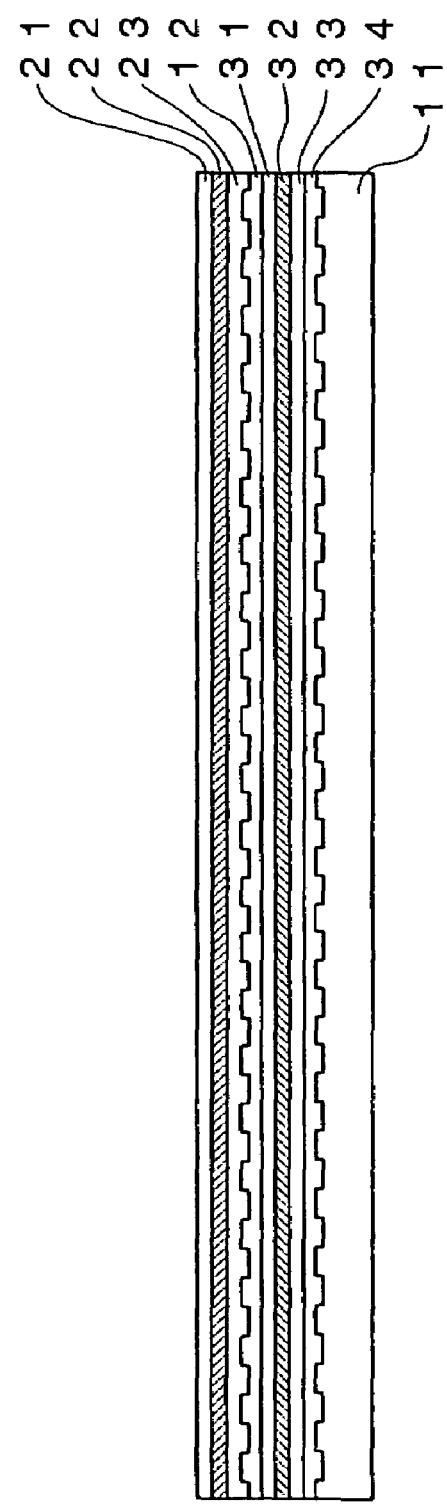
FIG. 5 is a drawing illustrating a part of a process (a step for forming an L0 layer 20) for manufacturing an optical recording medium 10.

Next, as shown in FIG. 4, ultraviolet curable acrylic resin is spin-coated onto the L1 layer 30, and by shining an ultraviolet ray through a stamper 41 in the state with its surface covered with the stamper 41, an intermediate layer 12 having grooves 12a and lands 12b is formed. Next, as shown in FIG. 5, the sputtering method is used to form, upon nearly the entire surface of the intermediate layer 12 on which the grooves 11a and the lands 11b are formed, a second dielectric film 23, an L0 recording film 22 and a first dielectric film 21 in this order. Thus, an L0 layer 20 is completed. Here, the phase of the L0 recording film 22 is normally in an amorphous phase immediately after the sputtering is completed.

Moreover, as shown in FIG. 1, ultraviolet curable acrylic resin is spin-coated onto the L0 layer 20, and by shining an ultraviolet ray, a light transmission layer 13 is formed. This completes all film deposition steps. In this specification, the optical recording medium in the state with the film deposition steps complete may also be called the "optical recording medium precursor."

Next, the optical recording medium precursor is placed upon the rotary table of a laser irradiation apparatus (not shown) and rotated while being continuously irradiated with a rectangular laser beam having a shorter length in the direction along the track and a longer length in the direction perpendicular to the track. By shifting the irradiation position in the direction perpendicular to the track each time the optical recording medium precursor makes one revolution, the rectangular laser beam can be shined over nearly the entire surface of the L0 recording film 22 and the L1 recording film 32. Thereby, the phase change material making up the L0 recording film 22 and the L1 recording film 32 is heated to a temperature equal to or higher than the crystallization temperature thereof and then cooled slowly, so the entire surface of the L0 recording film 22 and the L1 recording film 32 is put into the crystalline state, namely the unrecorded state. This process is called "an initializing process" in this specification.

When the initializing process is completed, the optical recording medium 10 is competed.

As described above, it is possible to record the desired digital data onto an optical recording medium 10 thus manufactured by aligning the focus of the laser beam during recording to either the L0 recording film 22 or the L1 recording film 32 to form recording marks. In addition, when data is recorded onto the L0 recording film 22 and/or L1 recording film 32 of the optical recording medium 10 in this manner, as described above, by aligning the focus of a laser beam set to playback power to either the L0 recording film 22 or the L1 recording film 32 and detecting the amount of light reflected, it is possible to play back the digital data thus recorded.

Next, a pulse train pattern used for recording data in the L0 recording film 22 and a pulse train pattern used for recording data in the L1 recording film 32 will be described in detail.

Since, as mentioned above, it is necessary to form the L0 recording film 22 to be considerably thinner than the L1 recording film 32 and a laser beam has to be projected onto the L1 recording film 32 via the L0 layer 20 when data are to be recorded in the L1 recording film 32, in this embodiment essentially different pulse train patterns are employed between the case of recording data in the L0 recording film 22 and the case of recording data in the L1 recording film 32.

Figure 6:
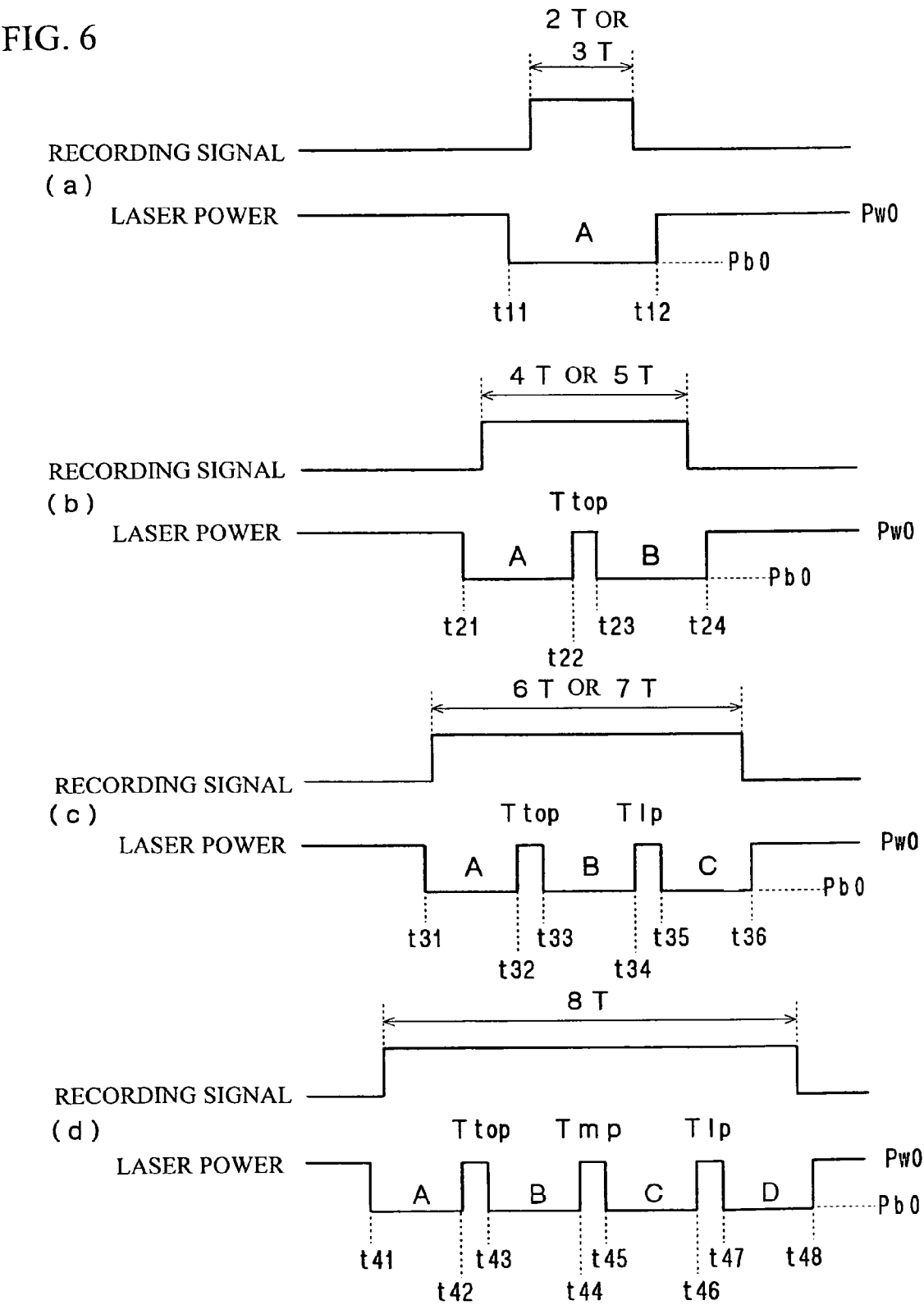

FIG. 6 is a set of waveform diagrams showing pulse train patterns used for recording data in the L0 recording film 22 of an optical recording medium 10, wherein FIG. 6(*a*) shows a case of recording a 2T signal or a 3T signal, FIG. 6(*b*) shows a case of recording a 4T signal or a 5T signal, FIG. 6(*c*) shows a case of recording a 6T signal or a 7T signal and FIG. 6(*d*) shows a case of recording an 8T signal.

As shown in FIGS. 6(*a*) to (*d*), in this embodiment, when data are to be recorded in the L0 recording film 22, a so-called "off-pulse recording format" is employed. In the off-pulse recording format, the power of the laser beam is modulated between two levels (two values) of a recording power (Pw0) and a bottom power (Pb0). The recording power (Pw0) is set to such a high level that the L0 recording film 22 can be melted by irradiation with the laser beam and the bottom power (Pb0) is set to such a low level that the melted L0 recording film 22 can be cooled even if it is irradiated with the laser beam. Although the recording power and the bottom power are not particularly limited, the recording power (Pw0) can be set to about 5 mW and the bottom power (Pb0) can be set to about 0.1 mW. Here, the values of the recording power (Pw0) and the bottom power (Pb0) are defined as those of the power of the laser beam at the surface of the optical recording medium 10.

When a recording mark is formed using this format, namely, when the phase of the L0 recording film 22 is changed to the amorphous phase, the power of the laser beam is modulated in accordance with the waveform having an amplitude between the recording power (Pw0) and the bottom power (Pb0) and the L0 recording film 22 heated to a temperature equal to or higher than the melting point thereof is quickly cooled. On the other hand, when the recording mark is to be erased, namely, when the L0 recording film 22 is to be crystallized, the power of the laser beam is fixed at the recording power (Pw0), thereby gradually cooling the L0 recording film 22 heated to a temperature equal to or higher than the melting point thereof. Thus, the recording mark is melt-erased. Hereinafter, concrete pulse train patterns for the respective recording marks will be described in detail.

First, as shown in FIG. 6(*a*), in the case of recording a 2T signal or a 3T signal in the L0 recording film 22, the number of "off-pulses" is set to 1. Here, the number of off-pulses is defined as the number of times the power of the laser beam is lowered to the bottom power (Pb0). The pulse width A of the off-pulse is not particularly limited but is preferably set to 2.6T to 3.0T when recording a 2T signal and set to 3.4T to 3.8T when recording a 3T signal. Here, as shown in FIG. 6(*a*), the pulse width A of the off-pulse means the interval from the time $t_{11}$ at which the power of the laser beam is changed from the recording power (Pw0) to the bottom power (Pb0) to the time $t_{12}$ at which the power of the laser beam is changed from the bottom power (Pb0) to the recording power (Pw0).

As a result, at a region where a 2T signal or a 3T signal is to be recorded, the L0 recording film 22 melted by irradiation with the laser beam of the recording power (Pw0) is quickly cooled during the off-pulse and the phase thereof is changed to the amorphous phase. On the other hand, at the other regions, the L0 recording film 22 melted by irradiation with the laser beam of the recording power (Pw0) is gradually cooled as the laser beam moves away, thereby being crystallized.

Further, as shown in FIG. 6(*b*), in the case of recording a 4T signal or a 5T signal in the L0 recording film 22, the number of "off-pulses" is set to 2. Here, the pulse widths A and B of the two off-pulses are not particularly limited but are preferably set to 2.0T to 2.4T when recording a 4T signal and set to 2.4T to 2.8T when recording a 5T signal. Here, as shown in FIG. 6(*b*), the pulse width A of the off-pulse means the interval from the time $t_{21}$ at which the power of the laser beam is first changed from the recording power (Pw0) to the bottom power (Pb0) to the time $t_{22}$ at which the power of the laser beam is first changed from the bottom power (Pb0) to the recording power (Pw0) and the pulse width B of the off-pulse means the interval from the time $t_{23}$ at which the power of the laser beam is second changed from the recording power (Pw0) to the bottom power (Pb0) to the time $t_{24}$ at which the power of the laser beam is second changed from the bottom power (Pb0) to the recording power (Pw0). Further, the width of a top pulse $T_{top}$ defined as the interval from the time $t_{22}$ to the time $t_{23}$ is not particularly limited but is preferably set to 0.4T to 0.6T.

As a result, at a region where a 4T signal or a 5T signal is to be recorded, the L0 recording film 22 melted by irradiation with the laser beam of the recording power (Pw0) is quickly cooled during the off-pulse and the phase thereof is changed to the amorphous phase. On the other hand, at the other regions, the L0 recording film 22 melted by irradiation with the laser beam of the recording power (Pw0) is gradually cooled as the laser beam moves away, thereby being crystallized.

Furthermore, as shown in FIG. 6(*c*), in the case of recording a 6T signal or a 7T signal in the L0 recording film 22, the number of "off-pulses" is set to 3. Here, the pulse widths A, B and C of the three off-pulses are not particularly limited but are preferably set to 1.6T to 2.0T when recording a 6T signal and set to 2.0T to 2.4T when recording a 6T signal. Here, as shown in FIG. 6(*c*), the pulse width A of the off-pulse means the interval from the time $t_{31}$ at which the power of the laser beam is first changed from the recording power (Pw0) to the bottom power (Pb0) to the time $t_{32}$ at which the power of the laser beam is first changed from the bottom power (Pb0) to the recording power (Pw0), the pulse width B of the off-pulse means the interval from the time $t_{33}$ at which the power of the laser beam is second changed from the recording power (Pw0) to the bottom power (Pb0) to the time $t_{34}$ at which the power of the laser beam is second changed from the bottom power (Pb0) to the recording power (Pw0), and the pulse width C of the off-pulse means the interval from the time $t_{35}$ at which the power of the laser beam is third changed from the recording power (Pw0) to the bottom power (Pb0) to the time $t_{36}$ at which the power of the laser beam is third changed from the bottom power (Pb0) to the recording power (Pw0). Further, the width of a top pulse $T_{top}$ defined as the interval from the time $t_{32}$ to the time $t_{33}$ and a last pulse $T_{lp}$ defined as the interval from the time $t_{34}$ to the time $t_{35}$ are not particularly limited but are preferably set to 0.4T to 0.6T.

As a result, at a region where a 6T signal or a 7T signal is to be recorded, the L0 recording film 22 melted by irradiation with the laser beam of the recording power (Pw0) is quickly cooled during the off-pulse and the phase thereof is changed to the amorphous phase. On the other hand, at the other regions, the L0 recording film 22 melted by irradiation with the laser beam of the recording power (Pw0) is gradually cooled as the laser beam moves away, thereby being crystallized.

Moreover, as shown in FIG. 6(d), in the case of recording an 8T signal in the L0 recording film 22, the number of "off-pulses" is set to 4. Here, the pulse widths A, B, C and D of the four off-pulses are not particularly limited but are preferably set to 1.6T to 2.0T. Here, as shown in FIG. 6(d), the pulse width A of the off-pulse means the interval from the time $t_{41}$ at which the power of the laser beam is first changed from the recording power (Pw0) to the bottom power (Pb0) to the time $t_{42}$ at which the power of the laser beam is first changed from the bottom power (Pb0) to the recording power (Pw0), the pulse width B of the off-pulse means the interval from the time $t_{43}$ at which the power of the laser beam is second changed from the recording power (Pw0) to the bottom power (Pb0) to the time $t_{44}$ at which the power of the laser beam is second changed from the bottom power (Pb0) to the recording power (Pw0), the pulse width C of the off-pulse means the interval from the time $t_{45}$ at which the power of the laser beam is third changed from the recording power (Pw0) to the bottom power (Pb0) to the time $t_{46}$ at which the power of the laser beam is third changed from the bottom power (Pb0) to the recording power (Pw0), and the pulse width D of the off-pulse means the interval from the time $t_{47}$ at which the power of the laser beam is fourth changed from the recording power (Pw0) to the bottom power (Pb0) to the time $t_{48}$ at which the power of the laser beam is fourth changed from the bottom power (Pb0) to the recording power (Pw0).

Further, the width of a top pulse $T_{top}$ defined as the interval from the time $t_{42}$ to the time $t_{43}$, the width of a multi-pulse $T_{mp}$ defined as the interval from the time $t_{44}$ to the time $t_{45}$ and a last pulse $T_{lp}$ defined as the interval from the time $t_{46}$ to the time $t_{47}$ are not particularly limited but are preferably set to 0.4T to 0.6T.

As a result, at a region where an 8T signal is to be recorded, the L0 recording film 22 melted by irradiation with the laser beam of the recording power (Pw0) is quickly cooled during the off-pulse and the phase thereof is changed to the amorphous phase. On the other hand, at the other regions, the L0 recording film 22 melted by irradiation with the laser beam of the recording power (Pw0) is gradually cooled as the laser beam moves away, thereby being crystallized.

The pulse train patterns described above are those used for recording data in the L0 recording film 22. In this embodiment, in the case of recording data in the L0 recording film 22 close to the light incidence plane 13a, the so-called off-pulse recording format is employed and recording marks are melt-erased. It is therefore possible to prevent the phase of a phase change material film having an extremely thin thickness from being returned to the amorphous phase that would be caused by solid-phase erasing recording marks formed therein. Therefore, since a sufficiently high erasing efficiency can be ensured, good overwriting characteristics can be obtained.

Next, pulse train patterns used for recording data in the L1 recording film 32 will be described.

Figure 7:
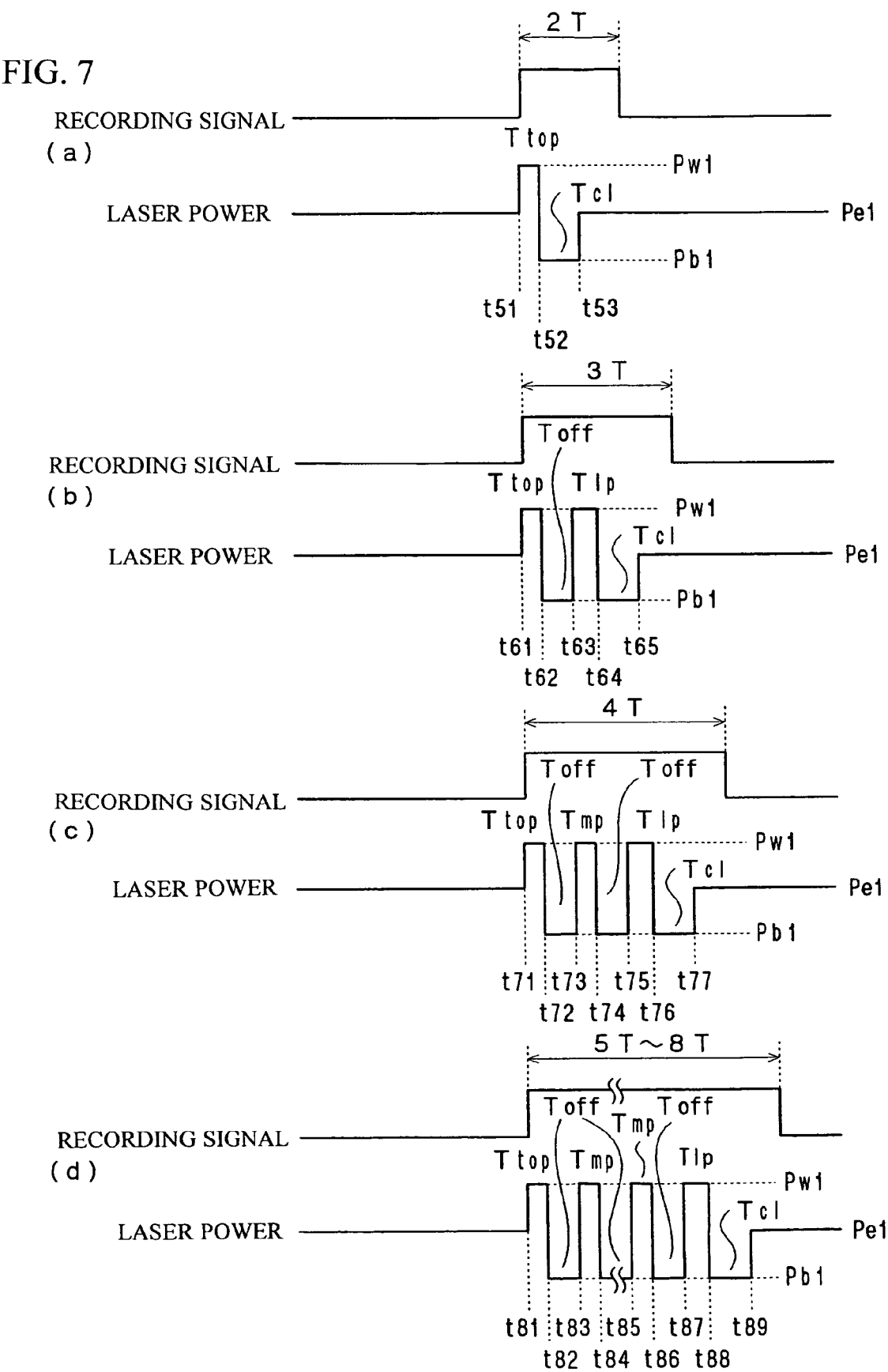

FIG. 7 is a set of waveform diagrams showing pulse train patterns used for recording data in the L1 recording film 32 of an optical recording medium 10, wherein FIG. 7(a) shows a case of recording a 2T signal, FIG. 7(b) shows a case of recording a 3T signal, FIG. 7(c) shows a case of recording a 4T signal and FIG. 7(d) shows a case of recording one of a 5T signal to an 8T signal.

As shown in FIGS. 7(a) to (d), in this embodiment, when data are to be recorded in the L1 recording film 32, a so-called "on-pulse recording format" is employed. In the on-pulse recording format, the power of the laser beam is modulated between three levels (three values) of a recording power (Pw1), an erasing power (Pe1) and a bottom power (Pb1). The recording power (Pw1) is set to such a high level that the L1 recording film 32 can be melted by irradiation with the laser beam, the erasing power (Pe1) is set to such a level that the L1 recording film 32 can be heated by irradiation with the laser beam to a temperature equal to or higher than the crystallization temperature thereof and lower than the melting point thereof, and the bottom power (Pb1) is set to such a low level that the melted L1 recording film 32 can be cooled even if it is irradiated with the laser beam.

In this case, since the laser beam is projected onto the L1 recording film 32 via the L0 layer 20, the laser beam has been considerably attenuated when it reaches the L1 recording film 32. Therefore, in order to sufficiently melt the L1 recording film 32, it is necessary to set the recording power (Pw1) to be considerably higher than the recording power (Pw0) used for recording data in the L0 recording film 22 and it is preferable to set the recording power (Pw1) double the recording power (Pw0). Therefore, when the recording power (Pw0) used for recording data in the L0 recording film 22 is set to about 5.0 mW, the recording power (Pw1) used for recording data in the L1 recording film 32 is preferably set to about 10.0 mW. In the case of setting the recording power (Pw1) to about 10.0 mW, it is preferable to set the erasing power (Pe1) to about 4.0 mW and the bottom powe (Pb1) to about 0.1 mW, although they are not particularly limited to these values. Here, the values of the recording power (Pw1), the erasing power (Pe1) and the bottom power (Pb1) are defined as those of the power of the laser beam at the surface of the optical recording medium 10.

When a recording mark is formed using this format, namely, when the phase of the L1 recording film 32 is changed to the amorphous phase, the power of the laser beam is modulated in accordance with the waveform having an amplitude between the recording power (Pw1) or the recording power (Pw1) and the bottom power (Pb1), and the L1 recording film 32 is heated to a temperature equal to or higher than the melting point thereof and is quickly cooled by setting the power of the laser beam to the bottom power (Pb1). On the other hand, when the recording mark is to be erased, namely, when the L1 recording film 32 is to be crystallized, the power of the laser beam is fixed at the erasing power (Pe1), thereby heating the L1 recording film 32 to a temperature equal to or higher than the crystallization temperature thereof and lower than the melting point thereof and gradually cooling the L1 recording film 32. Thus, the recording mark is solid-phase erased. Hereinafter, concrete pulse train patterns for the respective recording marks will be described in detail.

First, as shown in FIG. 7(a), in the case of recording a 2T signal in the L1 recording film 32, the number of "on-pulses" is set to 1 and a cooling interval $T_{cl}$ is inserted thereafter. Here, the number of on-pulses is defined as the number of times the power of the laser beam is raised to the recording power (Pw1). During the cooling interval $T_{cl}$, the power of the laser beam is set to the bottom power (Pb1). Therefore, in the case of recording a 2T signal, the power of the laser beam is set to the erasing power (Pe1) before the time $t_{51}$, set to the recording power (Pw1) during the period $(T_{top})$ from the time $t_{51}$ to the time $t_{52}$, set to the bottom power (Pb1) during the period $(T_{cl})$ from the time $t_{52}$ to the time $t_{53}$ and set to the erasing power (Pe1) after the time $t_{53}$.

Here, the width $T_{top}$ of a top pulse defined as the interval from the time $t_{51}$ to the time $t_{52}$ is not particularly limited but is preferably set to 0.3T to 0.5T. The cooling interval $T_{cl}$ defined as the interval from the time $t_{52}$ to the time $t_{53}$ is not particularly limited but is preferably set it to 0.7T to 1.0T.

As a result, at a region where a 2T signal is to be recorded, the L1 recording film 32 melted by irradiation with the laser beam of the recording power (Pw1) is quickly cooled during the cooling interval $T_{cl}$ and the phase thereof is changed to the amorphous phase. On the other hand, at the other regions, the L1 recording film 32 is heated to a temperature equal to or higher than the crystallization temperature thereof and lower than the melting point thereof and gradually cooled as the laser beam moves away, thereby being crystallized.

Further, as shown in FIG. 7(b), in the case of recording a 3T signal in the L1 recording film 32, the number of "on-pulses" is set to 2 and a cooling interval $T_{cl}$ is inserted thereafter. Therefore, in the case of recording a 3T signal, the power of the laser beam is set to the erasing power (Pe1) before the time $t_{61}$, set to the recording power (Pw1) during the period $(T_{top})$ from the time $t_{61}$ to the time $t_{62}$ and the period $(T_{lp})$ from the time $t_{63}$ to the time $t_{64}$, set to the bottom power (Pb1) during the period $(T_{off})$ from the time $t_{62}$ to the time $t_{63}$ and the period $(T_{cl})$ from the time $t_{64}$ to the time $t_{65}$, and set to the erasing power (Pe1) after the time $t_{65}$.

Here, the width $T_{top}$ of a top pulse defined as the interval from the time $t_{61}$ to the time $t_{62}$ is not particularly limited but is preferably set to 0.3T to 0.5T. The width $T_{lp}$ of a last pulse defined as the interval from the time $t_{63}$ to the time $t_{64}$ is not particularly limited but is preferably set to 0.4T to 0.6T. Further, an off interval $T_{off}$ defined as the interval from the time $t_{62}$ to the time $t_{63}$ is not particularly limited but is preferably set to 0.5T to 0.7T. Moreover, the cooling interval $T_{cl}$ defined as the interval from the time $t_{64}$ to the time $t_{65}$ is not particularly limited but is preferably set to 0.7T to 1.0T.

As a result, at a region where a 3T signal is to be recorded, the L1 recording film 32 melted by irradiation with the laser beam of the recording power (Pw1) is quickly cooled during the cooling interval $T_{cl}$ and the phase thereof is changed to the amorphous phase. On the other hand, at the other regions, the L1 recording film 32 is heated to a temperature equal to or higher than the crystallization temperature thereof and lower than the melting point thereof and gradually cooled as the laser beam moves away, thereby being crystallized.

Furthermore, as shown in FIG. 7(c), in the case of recording a 4T signal in the L1 recording film 32, the number of "on-pulses" is set to 3 and a cooling interval $T_{cl}$ is inserted thereafter. Therefore, in the case of recording a 4T signal, the power of the laser beam is set to the erasing power (Pe1) before the time $t_{71}$, set to the recording power (Pw1) during the period $(T_{top})$ from the time $t_{71}$ to the time $t_{72}$, the period $(T_{mp})$ from the time $t_{73}$ to the time $t_{74}$ and the period $(T_{lp})$ from the time $t_{75}$ to the time $t_{76}$, set to the bottom power (Pb1) during the period $(T_{off})$ from the time $t_{72}$ to the time $t_{73}$, the period $(T_{off})$ from the time $t_{74}$ to the time $t_{75}$ and the period $(T_{cl})$ from the time $t_{76}$ to the time $t_{77}$, and set to the erasing power (Pe1) after the time $t_{77}$.

Here, the width $T_{top}$ of a top pulse defined as the interval from the time $t_{71}$ to the time $t_{72}$ is not particularly limited but is preferably set to 0.3T to 0.5T. Moreover, the width $T_{mp}$ of a multi-pulse defined as the interval from the time $t_{73}$ to the time $t_{74}$ is not particularly limited but is preferably set to 0.3T to 0.5T. Furthermore, the width $T_{lp}$ of a last pulse defined as the interval from the time $t_{75}$ to the time $t_{76}$ is not particularly limited but is preferably set to 0.4T to 0.6T.

Further, an off interval $T_{off}$ defined as the interval from the time $t_{72}$ to the time $t_{73}$ and the interval from the time $t_{74}$ to the time $t_{75}$ is not particularly limited but is preferably to set to 0.5T to 0.7T. Moreover, the cooling interval $T_{cl}$ defined as the interval from the time $t_{76}$ to the time $t_{77}$ is not particularly limited but is preferably set to 0.7T to 1.0T.

As a result, at a region where a 4T signal is to be recorded, the L1 recording film 32 melted by irradiation with the laser beam of the recording power (Pw1) is quickly cooled during the cooling interval $T_{cl}$ and the phase thereof is changed to the amorphous phase. On the other hand, at the other regions, the L1 recording film 32 is heated to a temperature equal to or higher than the crystallization temperature thereof and lower than the melting point thereof and gradually cooled as the laser beam moves away, thereby being crystallized.

Moreover, as shown in FIG. 7(d), in the case of recording any one of a 5T signal to an 8T signal in the L1 recording film 32, the number of "on-pulses" is correspondingly set to one of 4 to 7 and a cooling interval $T_{cl}$ is inserted thereafter. The number of multi-pulses is set to 2 to 5 correspondingly to a 5T signal to an 8T signal. In this case, the power of the laser beam is set to the recording power (Pw1) during the period $T_{top}$ from the time $t_{81}$ to the time $t_{82}$, the periods $T_{mp}$ corresponding to those from the time $t_{83}$ to the time $t_{84}$, from the time $t_{85}$ to the time $t_{86}$ and so on and the period $T_{lp}$ from the time $t_{87}$ to the time $t_{88}$, set to the bottom power (Pb1) during the off periods $T_{off}$ corresponding to those from the time $t_{82}$ to the time $t_{83}$, from the time $t_{86}$ to the time $t_{87}$ and so on and the cooling interval $T_{cl}$ from the time $t_{88}$ to the time $t_{89}$, and set to the erasing power (Pe1) during the other periods. Further, although the pulse widths are not particularly limited, it is preferable to set the pulse width $T_{top}$ of the top pulse, the pulse width $T_{mp}$ of the multi-pulse and the pulse width $T_{lp}$ of the last pulse to 0.3T to 0.5T, 0.3T to 0.5T and 0.4T to 0.6T, respectively, and it is preferable to set the off period $T_{off}$ and the cooling interval $T_{cl}$ to 0.5T to 0.7T and 0.7T to 1.0T, respectively.

As a result, at a region where one of a 5T signal to an 8T signal is to be recorded, the L1 recording film 32 melted by irradiation with the laser beam of the recording power (Pw1) is quickly cooled during the cooling interval $T_{cl}$ and the phase thereof is changed to the amorphous phase. On the other hand, at the other regions, the L1 recording film 32 is heated to a temperature equal to or higher than the crystallization temperature thereof and lower than the melting point thereof and gradually cooled as the laser beam moves away, thereby being crystallized.

The pulse train patterns described above are those used for recording data in the L1 recording film 32. In this manner, in this embodiment, in the case of recording data in the L1 recording film 32 far from the light incidence plane 13a, the so-called on-pulse recording format is employed and the recording marks are erased using the laser beam having the erasing power (Pe1) lower than the recording power (Pw1). It is therefore possible to reduce the load on the laser generating device (semiconductor laser or the like) in comparison with the case where off-pulse recording is performed on the L1 recording film 32.

It is preferable to store information for identifying the pulse train patterns for the L0 recording film 22 and the L1 recording film 32 as "recording condition setting information" in the optical recording medium 10. If such recording condition setting information is stored in the optical recording medium 10, then when data are actually recorded in the optical recording medium 10 by the user, the recording condition setting information is read by an information recording apparatus and the pulse train patterns can be determined based on the thus read recording condition setting information. Therefore, for example, when the user requests recording of data in the L0 layer 20, the information recording apparatus records data using the pulse train patterns shown in FIG. 6 and when the user requests recording of data in the L1 layer 30, the information recording apparatus records data using the pulse train patterns shown in FIG. 7.

It is more preferable for the recording condition setting information to include not only information required for identifying the pulse train patterns for the L0 recording film 22 and the L1 recording film 32 but also information required for identifying various conditions such as the linear recording velocity required to record data in the optical recording medium 10. The recording condition setting information may be recorded in the optical recording medium 10 as a wobble signal or pre-pits, or it may be recorded as data in the L0 recording film 22 and/or the L1 recording film 32. Further, the recording condition setting information may include not only information directly indicating various conditions required to record data but also information capable of indirectly identifying the pulse train patterns by specifying any of various conditions stored in the information recording apparatus in advance.

Figure 8:
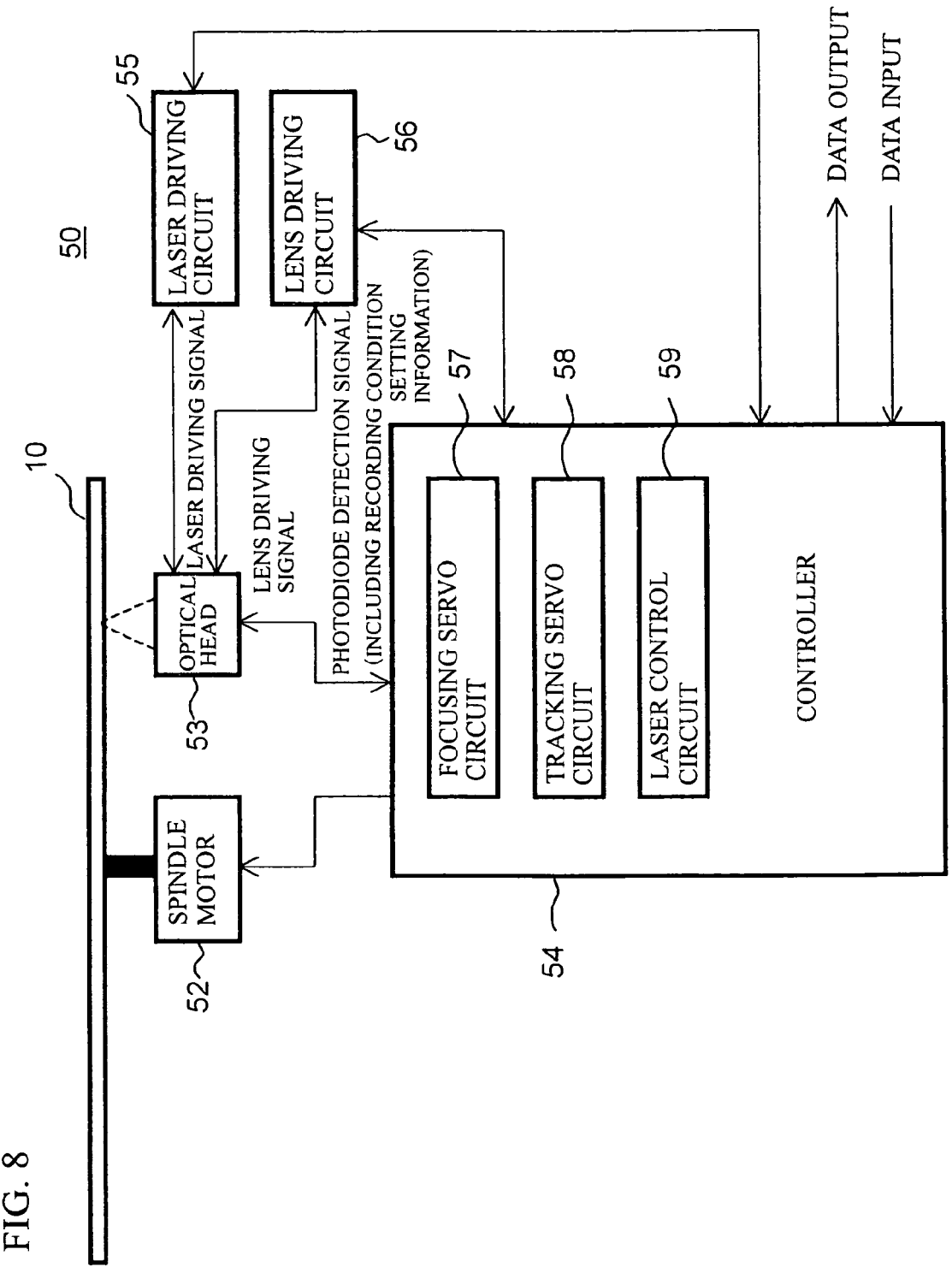
FIG. 8 is a schematic drawing of the major components of an information recording apparatus 50 for recording data in an optical recording medium 10.

FIG. 8 is a schematic drawing of the major components of an information recording apparatus 50 for recording data in the optical recording medium 10.

As shown in FIG. 8, the information recording apparatus 50 is equipped with a spindle motor 52 for rotating an optical recording medium 10, an optical head 53 for shining a laser beam onto the optical recording medium 10, a controller 54 for controlling the operation of the spindle motor 52 and the optical head 53, a laser driving circuit 55 that supplies a laser driving signal to the optical head 53, and a lens driving circuit 56 that supplies a lens driving signal to the optical head 53.

Moreover, as shown in FIG. 8, the controller 54 includes a focusing servo circuit 57, a tracking servo circuit 58, and a laser control circuit 59. When the focusing servo circuit 57 is activated, the focus is aligned with the recording surface of the rotating optical recording medium 10, and when the tracking servo circuit 58 is activated, the spot of the laser beam begins to automatically track the eccentric signal track of the optical recording medium 10. The focusing servo circuit 57 and tracking servo circuit 58 are provided with an auto gain control function for automatically adjusting the focusing gain and an auto gain control function for automatically adjusting the tracking gain, respectively. In addition, the laser control circuit 59 is a circuit that generates the laser driving signal supplied by the laser driving circuit 55 and generates a laser driving signal based on recording condition setting information recorded on the optical recording medium 10.

Note that the focusing servo circuit 57, tracking servo circuit 58 and laser control circuit 59 need not be circuits incorporated in the controller 54 but can instead be components separate of the controller 54. Moreover, they need not be physical circuits but can instead be accomplished by software programs executed in the controller 54.

In the case of recording data in the optical recording medium 10 using the thus constituted information recording apparatus 50, as described above, the recording condition setting information recorded in the optical recording medium 10 is read and pulse train patterns are determined based on the thus read recording condition setting information. Therefore, in the case of recording data in the L0 layer 20, the information recording apparatus 50 records data using the pulse train patterns shown in FIG. 6 based on the thus read recording condition setting information and in the case of recording data in the L1 layer 30, the information recording apparatus 50 records data using the pulse train patterns shown in FIG. 7 based on the thus read recording condition setting information.

As described above, in this embodiment, since the off-pulse recording format is employed in the case of recording data in the L0 layer 20 close to the light incidence plane 13a and the on-pulse recording format is employed in the case of recording data in the L1 layer 30 far from the light incidence plane 13a, even when data recorded in the L0 layer 20 are directly overwritten, a sufficiently high erasing efficiency can be ensured and it is possible to reduce the load on the laser generating device (semiconductor laser or the like).

In the above described embodiment, although explanation was made as to the case where the present invention was applied to a next-generation type optical recording medium in which data could be recorded and from which data could be reproduced using a laser beam having a wavelength of 200 to 450 nm, the present invention is not limited to such a next-generation type optical recording medium but can be applied to an optical recording medium such as a DVD in which data can be recorded and from which data can be reproduced using a laser beam having a wavelength of about 650 nm. A preferred embodiment in the case of applying the present invention to such an optical recording medium (hereinafter referred to as "a DVD type optical recording medium") will be described in the following.

The DVD type optical recording medium has the essentially same configuration as that of the optical recording medium 10 shown in FIG. 1 except for the thicknesses of the substrate 11, the intermediate layer 12 and the light transmission layer 13 and the shape of the grooves. Concretely, in the DVD type optical recording medium, the thicknesses of the substrate 11, the intermediate layer 12 and the light transmission layer 13 are set to 400 to 800 μm, 10 to 100 nm and 30 to 700 μm, respectively, and the depth and pitch of the grooves 11a (grooves 12a) are set to 40 to 100 nm and 0.4 to 0.9 μm, respectively.

In the case of recording data in the DVD type optical recording medium having the above identified configuration, a laser beam having a wavelength of about 650 nm is focused via the light incidence plane 13a onto one of the L0 recording film 22 and the L1 recording film 32 and the phase of a predetermined region of the L0 recording film 22 or the L1 recording film 32 is changed to the crystal phase or the amorphous phase by modulating the power of the laser beam. In this case, the 8/16 Modulation Code capable of recording any one of a 3T signal to a 14T signal is preferably employed.

As in the above described optical recording medium 10, in the DVD type optical recording medium, since it is necessary to set the thickness of the L0 recording film 22 to be considerably thinner than that of the L1 recording film 32, namely, about 0.3 to 0.8 times that of the L1 recording film 32, and to project a laser beam onto the L1 recording film 32 via the L0 recording film 22 when data are to be recorded in the L1 recording film 32, in this embodiment, the off-pulse recording format is employed in the case of recording data in the L0 recording film 22 and the on-pulse recording format is employed in the case of recording data in the L1 recording film 32.

Figure 9:
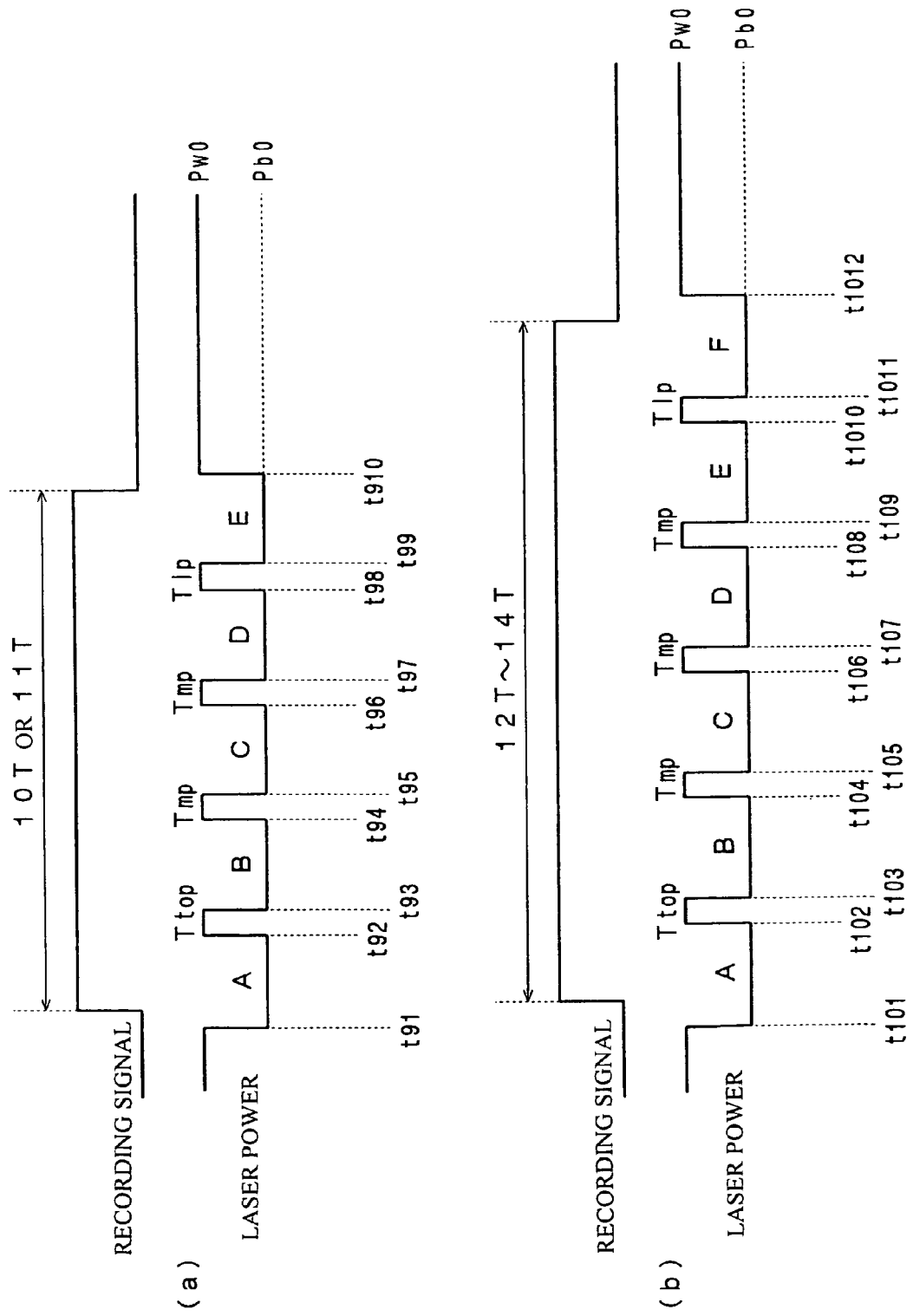

FIG. 9 is as set of waveform diagrams showing pulse train patterns used for recording data in the L0 recording film 22 in this embodiment, wherein FIG. 9(a) shows a case of recording a 10T signal or an 11T signal and FIG. 9(b) shows a case of recording one of a 12T signal to a 14T signal. Pulse train patterns used for recording any one of a 3T signal to an 8T signal are the same as those shown in FIGS. 6(a) to (d) for recording corresponding signals. Further, in the case of recording a 9T signal, the same pulse train pattern for recording an 8T signal shown in FIG. 6(d) is used except that the pulse widths A to D are set to 1.8T to 2.2T.

As shown in the diagrams of FIG. 9 (and FIG. 6), in this embodiment, when data are to be recorded in the L0 recording film 22, the off-pulse recording format is employed and the power of the laser beam is modulated between two levels (two values) of a recording power (Pw0) and a bottom power (Pb0). Although the recording power and the bottom power are not particularly limited, the recording power (Pw0) can be set to about 10 mW and the bottom power (Pb0) can be set to about 0.1 mW.

First, as shown in FIG. 9(a), in the case of recording a 10T signal or an 11T signal in the L0 recording film 22, the number of "off-pulses" is set to 5. Here, the pulse widths A, B, C, D and E of five off-pulses are not particularly limited but are preferably set to 2.0T to 2.4T when recording a 10T signal and set to 2.4T to 2.8T when recording an 11T signal. As shown in FIG. 9(a), the pulse width A of the off-pulse means the interval from the time $t_{91}$ to the time $t_{92}$, the pulse width B of the off-pulse means the interval from the time $t_{93}$ to the time $t_{94}$, the pulse width C of the off-pulse means the interval from the time $t_{95}$ to the time $t_{96}$, the pulse width D of the off-pulse means the interval from the time $t_{97}$ to the time $t_{98}$ and the pulse width E of the off-pulse means the interval from the time $t_{99}$ to the time $t_{910}$.

Further, the width of a top pulse $T_{top}$ defined as the interval from the time $t_{92}$ to the time $t_{93}$, the width of a multi-pulse $T_{mp}$ defined as the interval from the time $t_{94}$ to the time $t_{95}$ and the interval from the time $t_{96}$ to the time $t_{97}$ and a last pulse $T_{lp}$ defined as the interval from the time $t_{98}$ to the time $t_{99}$ are not particularly limited but are preferably set to 0.4T to 0.6T.

Furthermore, as shown in FIG. 9(b), in the case of recording a 12T signal to a 14T signal in the L0 recording film 22, the number of "off-pulses" is set to 6. Here, the pulse widths A, B, C, D, E and F of six off-pulses are not particularly limited but are preferably set to 1.6T to 2.0T when recording a 12T signal, set to 1.8T to 2.2T when recording an 13T signal and set to 2.0T to 2.4T when recording an 14T signal. As shown in FIG. 9(b), the pulse width A of the off-pulse means the interval from the time $t_{101}$ to the time $t_{102}$, the pulse width B of the off-pulse means the interval from the time $t_{103}$ to the time $t_{104}$, the pulse width C of the off-pulse means the interval from the time $t_{105}$ to the time $t_{106}$, the pulse width D of the off-pulse means the interval from the time $t_{107}$ to the time $t_{108}$, the pulse width E of the off-pulse means the interval from the time $t_{109}$ to the time $t_{1010}$ and the pulse width F of the off-pulse means the interval from the time $t_{1011}$ to the time $t_{1012}$.

Further, the width of a top pulse $T_{top}$ defined as the interval from the time $t_{102}$ to the time $t_{103}$, the width of a multi-pulse $T_{mp}$ defined as the interval from the time $t_{104}$ to the time $t_{105}$, the interval from the time $t_{106}$ to the time $t_{107}$ and the interval from the time $t_{108}$ to the time $t_{109}$, and a last pulse $T_{lp}$ defined as the interval from the time $t_{1010}$ to the time $t_{1011}$ are not particularly limited but are preferably set to 0.4T to 0.6T.

The pulse train patterns described above are those used for recording data in the L0 recording film 22. In this embodiment, in the case of recording data in the L0 recording film 22 close to the light incidence plane 13a, the so-called off-pulse recording format is employed and recording marks are melt-erased. It is therefore possible to prevent the phase of a phase change material film having an extremely thin thickness from being returned to the amorphous phase as would be caused by solid-phase erasing recording marks formed therein. Therefore, since a sufficiently high erasing efficiency can be ensured, good overwriting characteristics can be obtained.

Next, pulse train patterns used for recording data in the L1 recording film 32 will be described.

Figure 10:
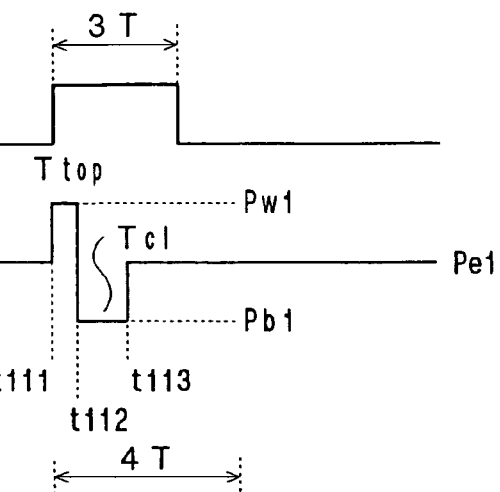
Figure 10:
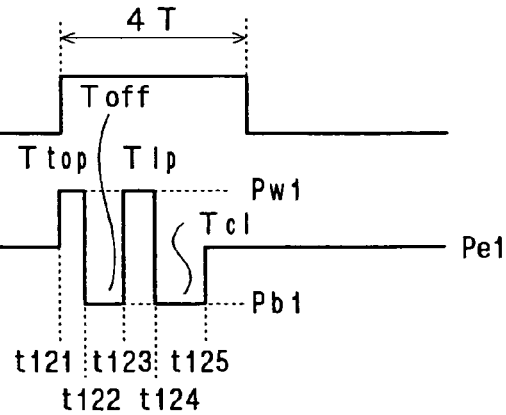
Figure 10:
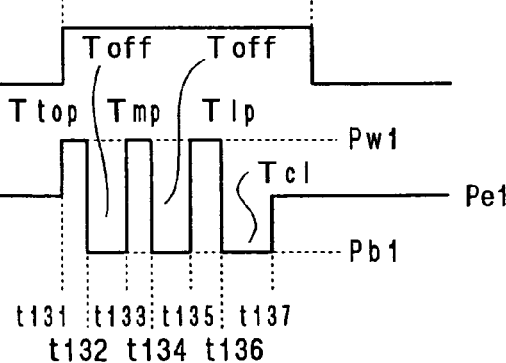
Figure 10:
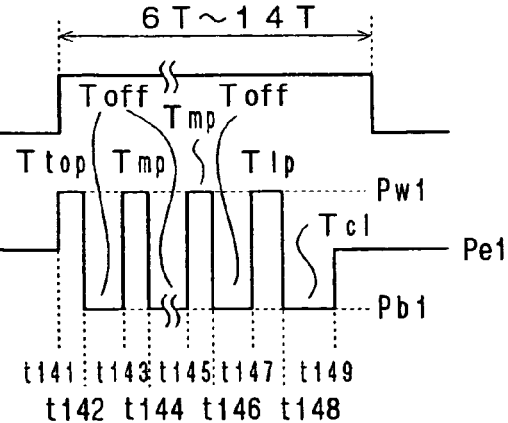

FIG. 10 is a set of waveform diagrams showing pulse train patterns used for recording data in the L1 recording film 32 in this embodiment, wherein FIG. 10(a) shows a case of recording a 3T signal, FIG. 10(b) shows a case of recording a 4T signal, FIG. 10(c) shows a case of recording a 5T signal and FIG. 10(d) shows a case of recording one of a 6T signal to a 14T signal.

As shown in FIGS. 10(a) to (d), in this embodiment, when data are to be recorded in the L1 recording film 32, the on-pulse recording format is employed and the power of a laser beam is modulated between three levels (three values) of a recording power (Pw1), an erasing power (Pe1) and a bottom power (Pb1). Although the recording power, the erasing power and the bottom power are not particularly limited, the recording power (Pw1) can be set to about 14.0 mW, the erasing power (Pe1) can be set to about 7.0 mW and the bottom power (Pb1) can be set to about 0.1 mW.

First, as shown in FIG. 10(a), similarly to the case of recording a 2T signal in the L1 recording film 32 of the above described optical recording medium 10, in the case of recording a 3T signal in the L1 recording film 32, the number of "on-pulses" is set to 1 and a cooling interval $T_{cl}$ is inserted thereafter. Therefore, in the case of recording a 3T signal, the power of the laser beam is set to the erasing power (Pe1) before the time $t_{111}$, set to the recording power (Pw1) during the period ($T_{top}$) from the time $t_{111}$ to the time $t_{112}$, set to the bottom power (Pb1) during the period ($T_{cl}$) from the time $t_{112}$ to the time $t_{113}$ and set to the erasing power (Pe1) after the time $t_{113}$.

Here, the width $T_{top}$ of a top pulse and the cooling interval $T_{cl}$ are not particularly limited but are preferably set to 0.5T to 0.7T and 0.7T to 1.0T, respectively.

Further, as shown in FIG. 10(b), similarly to the case of recording a 3T signal in the L1 recording film 32 of the above described optical recording medium 10, in the case of recording a 4T signal in the L1 recording film 32, the number of "on-pulses" is set to 2 and a cooling interval $T_{cl}$ is inserted thereafter. Therefore, in the case of recording a 4T signal, the power of the laser beam is set to the erasing power (Pe1) before the time $t_{121}$, set to the recording power (Pw1) during the period ($T_{top}$) from the time $t_{121}$ to the time $t_{122}$ and the period ($T_{lp}$) from the time $t_{123}$ to the time $t_{124}$, set to the bottom power (Pb1) during the period ($T_{off}$) from the time $t_{122}$ to the time $t_{123}$ and the period ($T_{cl}$) from the time $t_{124}$ to the time $t_{125}$, and set to the erasing power (Pe1) after the time $t_{125}$.

Here, the pulse width $T_{top}$ of a top pulse, the pulse width $T_{lp}$ of a last pulse, an off period $T_{of}$ and the cooling interval $T_{cl}$ are not particularly limited but are preferably set to 0.3T to 0.5T, 0.4T to 0.6T, 0.5T to 0.7T and 0.7T to 1.0T, respectively.

Furthermore, as shown in FIG. 10(c), similarly to the case of recording a 4T signal in the L1 recording film 32 of the above described optical recording medium 10, in the case of recording a 5T signal in the L1 recording film 32, the number of "on-pulses" is set to 3 and a cooling interval $T_{cl}$ is inserted thereafter. Therefore, in the case of recording a 5T signal, the power of the laser beam is set to the erasing power (Pe1) before the time $t_{131}$, set to the recording power (Pw1) during the period ($T_{top}$) from the time $t_{131}$ to the time $t_{132}$, the period ($T_{mp}$) from the time $t_{133}$ to the time $t_{134}$ and the period ($T_{lp}$) from the time $t_{135}$ to the time $t_{136}$, set to the bottom power (Pb1) during the period ($T_{off}$) from the time $t_{132}$ to the time $t_{133}$, the period ($T_{off}$) from the time $t_{134}$ to the time $t_{135}$ and the period ($T_{cl}$) from the time $t_{136}$ to the time $t_{137}$, and set to the erasing power (Pe1) after the time $t_{137}$.

Here, the pulse width $T_{top}$ of a top pulse, the pulse width of a multi-pulse, the pulse width $T_{lp}$ of a last pulse, an off period $T_{of}$ and the cooling interval $T_{cl}$ are not particularly limited but are preferably set to 0.3T to 0.5T, 0.3T to 0.5T, 0.4T to 0.6T, 0.5T to 0.7T and 0.7T to 1.0T, respectively.

Moreover, as shown in FIG. 10(d), in the case of recording any one of a 6T signal to a 14T signal in the L1 recording film 32, the number of "on-pulses" is correspondingly set to one of 4 to 12 and a cooling interval $T_{cl}$ is inserted thereafter. The number of multi-pulses is set to 2 to 10 correspondingly to a 6T signal to a 14T signal. In this case, the power of the laser beam is set to the recording power (Pw1) during the period $T_{top}$ from the time $t_{141}$ to the time $t_{142}$, the periods $T_{mp}$ corresponding to those from the time $t_{143}$ to the time $t_{144}$, from the time $t_{145}$ to the time $t_{146}$ and so on and the period $T_{lp}$ from the time $t_{147}$ to the time $t_{148}$, set to the bottom power (Pb1) during the off periods $T_{off}$ corresponding to those from the time $t_{142}$ to the time $t_{143}$, from the time $t_{146}$ to the time $t_{147}$ and so on and the cooling interval $T_{cl}$ from the time $t_{148}$ to the time $t_{149}$, and set to the erasing power (Pe1) during the other periods. Further, although the pulse widths are not particularly limited, it is preferable to set the pulse width $T_{top}$ of the top pulse, the pulse width $T_{lp}$ of the multi-pulse and the pulse width $T_{lp}$ of the last pulse to 0.3T to 0.5T, 0.3T to 0.5T and 0.4T to 0.6T, respectively, and it is preferable to set the off period $T_{off}$ and the cooling interval $T_{cl}$ to 0.5T to 0.7T and 0.7T to 1.0T, respectively.

The pulse train patterns described above are those used for recording data in the L1 recording film 32. In this manner, in this embodiment, in the case of recording data in the L1 recording film 32 far from the light incidence plane 13a, since the so-called on-pulse recording format is employed and the recording marks are erased using the laser beam having the erasing power (Pe1) lower than the recording power (Pw1), it is possible to reduce load on the laser generating device (semiconductor laser or the like) in comparison with the case where the off-pulse recording is performed on the L1 recording film 32.

The present invention is in no way limited to the aforementioned embodiments and various modifications are possible within the scope of the invention as recited in the claims, and these are naturally included within the scope of the invention.

For example, in the preferred embodiments set out above, an optical recording medium having two recording layers was described, but the optical recording media to which the present invention can be applied are not limited thereto and the present invention is also applicable to optical recording media having three or more recording layers. In this case, the off-pulse recording format can be employed in the case of recording data in at least the information recording layer closest to the light incidence plane 13a and the on-pulse recording format can be employed in the case of recording data in at least the information recording layer farthest from the light incidence plane 13a.

Further, in the preferred embodiments set out above, in the case of recording information in the L1 layer 30, the power of the laser beam is modulated between three levels (three values) of a recording power (Pw1), an erasing power (Pe1) and a bottom power (Pb1). However, it is possible to record information in the L1 layer 30 by modulating the power of the laser beam between four values.

As described above, according to the present invention, even when data recorded in an optical recording medium having a plurality of information recording layers are directly overwritten, a sufficiently high erasing efficiency can be ensured.

The invention claimed is:

1. An information recording method for recording information in a data rewritable type optical recording medium having at least stacked first and second information recording layers by projecting a laser beam thereonto via a light incidence plane, the information recording method comprising steps of recording information in the first information recording layer in accordance with an off-pulse recording format and recording information in the second information recording layer in accordance with an on-pulse recording format.

2. An information recording method in accordance with claim 1, wherein the first information recording layer is located on the side of the second information recording layer on which the light incidence plane is present.

3. An information recording method in accordance with claim 1, wherein each of the first and second information recording layers includes a recording film formed of a phase change material and dielectric layers sandwiching the recording film therebetween and the recording film included in the first information recording layer is thinner than that included in the second information recording layer.

4. An information recording method in accordance with claim 2, wherein each of the first and second information recording layers includes a recording film formed of a phase change material and dielectric layers sandwiching the recording film therebetween and the recording film included in the first information recording layer is thinner than that included in the second information recording layer.

5. An information recording method for recording information in an optical recording medium having at least stacked first and second information recording layers containing a phase change material by projecting a laser beam thereonto via a light incidence plane, the information recording method comprising steps of recording information in the first information recording layer in accordance with a pulse train pattern by which data can be melt erased and recording information in the second information recording layer in accordance with a pulse train pattern by which data can be solid phase erased.

6. An information recording method for recording information in an optical recording medium having at least stacked first and second information recording layers containing a phase change material by projecting a laser beam thereonto via a light incidence plane, the information recording method comprising steps of recording information in the first information recording layer by modulating intensity of the laser beam between two values and recording information in the second information recording layer by modulating intensity of the laser beam between three or more values.

7. An information recording apparatus for recording information in a data rewritable type optical recording medium having at least stacked first and second information recording layers by projecting a laser beam thereonto via a light incidence plane, the information recording apparatus being constituted so as to record information in the first information recording layer in accordance with an off-pulse recording format and record information in the second information recording layer in accordance with an on-pulse recording format.

8. An information recording apparatus in accordance with claim 7, wherein the first information recording layer is located on the side of the second information recording layer on which the light incidence plane is present.

9. An information recording apparatus in accordance with claim 7, wherein each of the first and second information recording layers includes a recording film formed of a phase change material and dielectric layers sandwiching the recording film therebetween and the recording film included in the first information recording layer is thinner than that included in the second information recording layer.

10. An information recording apparatus in accordance with claim 8, wherein each of the first and second information recording layers includes a recording film formed of a phase change material and dielectric layers sandwiching the recording film therebetween and the recording film included in the first information recording layer is thinner than that included in the second information recording layer.

11. An optical recording medium which includes at least stacked first and second information recording layers and in which information can be recorded by projecting a laser beam thereonto via a light incidence plane, which optical recording medium comprises setting information required for recording information in the first information recording layer in accordance with an off-pulse recording format and recording information in the second information recording layer in accordance with an on-pulse recording format.

12. An optical recording medium in accordance with claim 11, wherein the first information recording layer is located on the side of the second information recording layer on which the light incidence plane is present.

13. An optical recording medium in accordance with claim 11, wherein each of the first and second information recording layers includes a recording film formed of a phase change material and dielectric layers sandwiching the recording film therebetween and the recording film included in the first information recording layer is thinner than that included in the second information recording layer.

14. An optical recording medium in accordance with claim 12, wherein each of the first and second information recording layers includes a recording film formed of a phase change material and dielectric layers sandwiching the recording film therebetween and the recording film included in the first information recording layer is thinner than that included in the second information recording layer.

15. An optical recording medium in accordance with claim 13, wherein the recording film included in the first information recording layer has a thickness 0.3 to 0.8 times that of the recording film included in the second information recording layer.

16. An optical recording medium in accordance with claim 14, wherein the recording film included in the first information recording layer has a thickness 0.3 to 0.8 times that of the recording film included in the second information recording layer.

* * * * *